United States Patent [19]

Steinbrecher et al.

[11] Patent Number: 4,803,420
[45] Date of Patent: Feb. 7, 1989

[54] METHOD OF DETERMINING THE POSITION OF THE TAP ON A RESISTANCE TELETRANSMITTER

[75] Inventors: Jürgen K. Steinbrecher, Melsungen; Ulrich Schnell, Baunatal, both of Fed. Rep. of Germany

[73] Assignee: U.S. Philips Corp., New York, N.Y.

[21] Appl. No.: 106,076

[22] Filed: Oct. 7, 1987

[30] Foreign Application Priority Data

Oct. 7, 1986 [DE] Fed. Rep. of Germany ....... 3634051

[51] Int. Cl.$^4$ ............................................. G01R 27/14
[52] U.S. Cl. .................................. 324/64; 340/870.38; 340/660
[58] Field of Search .................... 324/65 R, 63, 64; 340/870.38, 660, 662, 663, 661

[56] References Cited

U.S. PATENT DOCUMENTS

3,302,194  1/1967  Green et al. ........................... 324/64
3,969,672  7/1976  Wallander et al. .................. 324/133

FOREIGN PATENT DOCUMENTS

2460079   7/1976  Fed. Rep. of Germany ........ 324/64
3101994   7/1982  France .
208472   11/1984  Japan .................................... 324/64

Primary Examiner—Reinhard J. Eisenzopf
Assistant Examiner—Maura K. Regan
Attorney, Agent, or Firm—Bernard Franzblau

[57] ABSTRACT

A method of and a circuit arrangement for determining the position k of the tap (1) on a resistance teletransmitter (2). A voltage (U1) is determined between a first conductor (21) connected to a first connection (10) of the resistance teletransmitter (2) and to a current source (20) and a second conductor (25) connected to the tap (1). A voltage (U2) is determined between the second conductor (25) and a third conductor (27) connected to a second connection (11) of the resistance teletransmitter (2). Further, a voltage (U3) is determined at a reference resistor (28), which is connected between the third conductor (27) and zero potential. The position k of the tap can be calculated from these measured voltages.

10 Claims, 1 Drawing Sheet

METHOD OF DETERMINING THE POSITION OF THE TAP ON A RESISTANCE TELETRANSMITTER

BACKGROUND OF THE INVENTION

The invention relates to a method of determining the position k of the tap on a resistance teletransmitter comprising two fixed resistance ranges, between which an effective resistance range is provided, in which the tap is adjustable. The first connection of the resistance teletransmitter is connected to a current source and can be connected through a first conductor to an instrument amplifier, its tap constituting a central connection is connected to a second conductor and its second connection can be connected through a third conductor to the instrument amplifier.

Such a method and a circuit arrangement for carrying out this method are known from Philips apparatuses KS 4400 or KS 4450. Such apparatuses serve, for example, for recording the height of the level of a liquid. Two current sources are then utilized, which are each connected to an input of an instrument amplifier. One current source is connected to the first connection of the resistance teletransmitter and the other current source is connected to the second connection of the resistance teletransmitter. The adjustable tap on the resistance teletransmitter constituting the central connection is connected to zero potential. Such a resistance teletransmitter has an effective resistance range, in which the tap is adjustable, and two fixed resistance ranges, which are each applied to the first and second connection, respectively, of the resistance teletransmitter. The two fixed resistance ranges and the effective resistance range can be adjusted by the user, that is to say that the resistance values of the fixed resistance ranges may be equal to zero. The output of the instrument amplifier is connected to the input of a succeeding analogue-to-digital converter, which supplies at its output digital signals for an indication device or for a control unit.

A disadvantage of this known method and known circuit arrangement is that the current sources must be balanced to equality in order that the measurement becomes independent of the conduction resistances of the first, second and third conductors. Likewise, amplification errors and the offset of the instrumental amplifier must be compensated for, which involves complicated operations. Since the measured values are represented in a digital indication device, in the known circuit arrangement an analogue-to-digital converter is utilized. As a result, besides the complicated balancing step for eliminating the conduction resistances, the temperature drift of the instrumental amplifier and in addition the temperature drift of the analogue-to-digital converter also influence the measuring result.

The known method and the known circuit arrangement are therefore not suitable for use in devices which from a commercial view-point must lie at a low price level (low-cost device) because analogue-to-digital converters having a very small temperature drift represent a considerable factor of cost.

It should be noted that Kokai 52-145 246 discloses a circuit arrangement for determining the resistance value of an effective resistance range by means of a resistance teletransmitter. In this case, the first connection of the resistance teletransmitter is connected through a first conductor to a current source, the central connection is connected through a second conductor to the non-inverting input of an amplifier and the second connection is connected on the one hand through a third conductor to the inverting input of the amplifier and on the other hand through a fourth conductor to ground. In this arrangement, elimination of the conduction resistances is also attained. However, only one resistance range is determined. The tap position of the resistance teletransmitter cannot be determined without further expedients. Moreover, this circuit arrangement is complicated and expensive due to the use of a fourth conductor.

DE OS No. 3101994 discloses a circuit arrangement, which relates to the measurement of an electrical resistance. In this circuit arrangement, three switches each having two closing contacts are present. The first closing contact of the first switch connects a current source to an auxiliary resistor connected to ground; the other closing contact is coupled to an analog-to-digital converter. The second switch connects the current source, the analog-to-digital converter and a reference resistor to each other. The reference resistor is connected to the ground-free connection of the auxiliary resistor. The third switch connects the resistor to be measured, which is also connected to the auxiliary resistor, to the current source and to the analog-to-digital converter. Of the three switches, which are successively actuated, only one is closed at a time. A computer succeeding the analog-to-digital converter calculates from the three voltages measured at the analog-to-digital converter the resistance of the resistor to be measured. The measuring values do not exhibit temperature-dependent errors. With this circuit arrangement it is not possible to determine the position k of a resistance teletransmitter. Moreover, a compensation of conduction resistances cannot be obtained by this measuring arrangement.

SUMMARY OF THE INVENTION

Therefore, the present invention has for its object to provide a method of the kind mentioned in the opening paragraph, in which the tap position of the resistance teletransmitter is determined in a simple manner without the influence of the conduction resistances.

This object is achieved in a method of the kind mentioned in the opening paragraph in that
(a) a voltage U1 is measured between the first conductor and the second conductor that can also be connected to the instrumental amplifier;
(b) a voltage U2 is measured between the second conductor and the third conductor;
(c) a voltage U3 is recorded across a reference resistor Rs located between the third conductor and zero potential for determining the current flowing through the conductors, and
(d) the position k is calculated in the digital computer with reference to the equation $$k = \frac{U2 - U1}{U3} K1 + K2$$

with the constants $$K1 = \frac{Rs}{2R} \text{ and } K2 = \frac{1}{2} + \frac{R1 - R2}{2R}$$

where $0 \leq k \leq 1$ and R1 and R2 are the resistance values of the fixed resistance ranges and R is the resistance value of the effective resistance range.

In the method according to the invention, the position k of the tap on the resistance teletransmitter is determined in a simple manner, i.e. in that the voltages between the conductors and the voltage at the reference resistor are measured. The voltages can succeed each other in time or can be measured simultaneously. The resistance values R, R1, R2 and Rs may be determined, for example, by measurement before use of the resistance teletransmitter. It is then also possible to adjust the fixed and effective resistance ranges, respectively. It is also possible that the resistance values of the fixed resistance ranges are equal to zero, that is to say that the tap is adjustable over the whole resistance teletransmitter. Moreover, in this method no balancing step for eliminating the conduction resistances is required because the conduction resistances do not influence the calculation of the position k of the tap.

In a further embodiment of the invention, it is ensured that for determining the constants K1 and K2 the tap of the resistance teletransmitter is taken to the two final positions k=0 and k=1 and in these final positions the constants K1 and K2 are calculated from the voltages U1, U2 and U3 according to the equations $$K1 = \frac{1}{\frac{U21 - U11}{U31} - \frac{U20 - U10}{U30}},$$

$$K2 = \frac{\frac{U20 - U10}{U30}}{\frac{U20 - U10}{U30} - \frac{U21 - U11}{U31}}$$

where Un0, n=1, 2, 3, is a voltage at k=0 and Un1, n=1, 2, 3, is a voltage at k=1. In this case, for determining the constants K1 and K2 instead of measuring the resistance values of the resistance ranges, the tap on the resistance teletransmitter is moved to the respective final positions at k=0 and k=1, after which the voltages between the different conductors and at the reference resistor are determined. After the measurement of the different voltages, the constants K1 and K2 can then be calculated.

According to an advantageous embodiment of the method, the inputs of the instrumental amplifier are applied to zero potential, after which the measured voltages are converted in an analog-to-digital converter succeeding the instrumental amplifier to corresponding digital values, whereupon the position k is determined from the equation $$k = \frac{D2 - D1}{D3 - D0} K1 + K2$$

with $$K1 = \frac{1}{\frac{D21 - D11}{D31 - D01} - \frac{D20 - D10}{D30 - D00}},$$

$$K2 = \frac{\frac{D20 - D10}{D30 - D00}}{\frac{D20 - D10}{D30 - D00} - \frac{D21 - D11}{D31 - D01}}$$

where Dn, n=1, 2, 3, represents the digital values of the voltages Un, n=1, 2, 3, D0 is the digital value with zero potential at the input of the instrumental amplifier and Dn1 and Dn0, n=0, 1, 2, 3, represent the digital values in the positions k=1 and 0, respectively.

In this further embodiment of the invention, the output voltage of the instrumental amplifier is determined when its input is shortcircuited, i.e. is applied to zero potential. This output voltage of the instrumental amplifier at zero potential at the input is converted into a digital value D0. This value D0 is recorded in order that the measuring result is not influenced by the amplification error and the offset of the instrumental amplifier and by the temperature drift of the instrumental amplifier and that of the analog-to-digital converter. The method according to the invention can be carried out in a comparatively simple manner as compared with the method frequently used hitherto for measuring the position k of the tap on a resistance teletransmitter and the cost for carrying out the method can be kept low. The balancing steps usual hitherto for the instrumental amplifier are also dispensed with.

Advantageously, the calculation of the position k of the tap on the resistance teletransmitter and of the constants K1 and K2 takes place by means of a calculation device, which may be, for example, a microcomputer which is connected to the output of the analog-to-digital converter.

A circuit arrangement for carrying out the method described is characterized in that the first connection of a resistance teletransmitter is connected to a current source and to a first conductor, the tap constituting a central connection is connected to a second conductor and the second connection is connected to a third conductor and to a reference resistor connected in turn to zero potential.

The advantage of this circuit arrangement as compared with the known circuit arrangements consists in that in this case only one current source is used, i.e. a balancing step for equal adjustment of the current sources may be dispensed with. This current source need not necessarily have a small temperature drift either because the measurement is carried out rapidly and the measurement is consequently strongly temperature-independent. Only the reference resistor must have a sufficiently small temperature drift.

According to a particular embodiment of the circuit arrangement, the three leads extending in a direction away from the resistance teletransmitter are connected to the inputs of a multiplexer, whose outputs are connected to the instrument amplifier, while a further input of the multiplexer is connected to zero potential. The multiplexer permits that the individual conductors are switched in a predetermined manner to the inputs of the instrument amplifier. The analog-to-digital converter succeeding the instrument amplifier supplies the measuring result to the storage device of a computer or an arbitrary other storage device. In order to attain a precise measuring result, the only requirement imposed on the multiplexer switches is that these switches behave as equally as possible with respect to the temperature drift.

BRIEF DESCRIPTION OF THE DRAWING

In order that the invention may be readily carried into effect, it will now be described more fully, by way of example, with reference to the accompanying drawing, in which.

DESCRIPTION OF THE PREFERRED EMBODIMENTS

Figure 1:
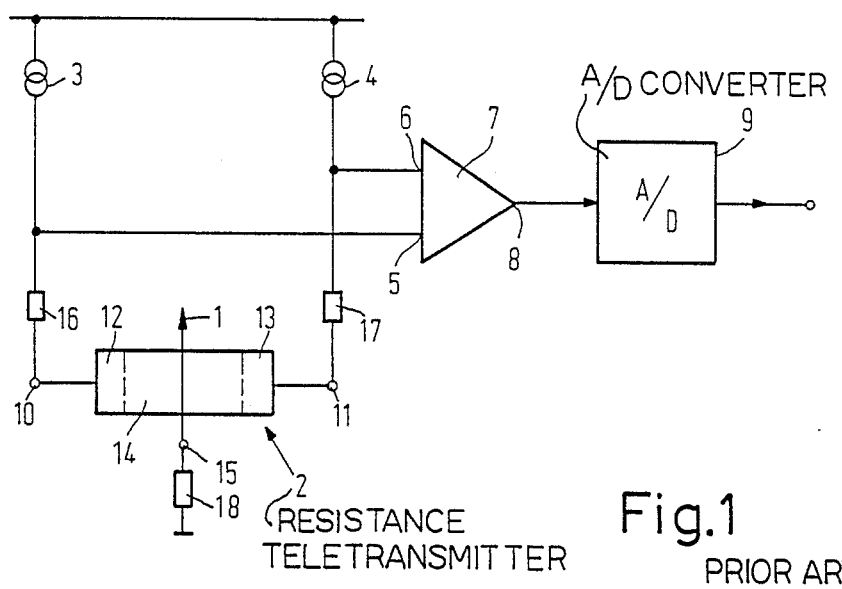
FIG. 1 shows a known circuit arrangement for carrying out a known measuring method with the use of two current sources.

A known circuit arrangement for determining the position k of a tap 1 on a resistance teletransmitter 2 is shown in FIG. 1. This circuit arrangement comprises two current sources 3 and 4, which are each connected to one of the inputs 5 and 6 of an instrument amplifier 7. The output 8 of the instrument amplifier 7 is connected to an analog-to-digital converter 9. The analog-to-digital converter 9 supplies digital values for example to an indication device. Moreover, the current source 3 is connected to a first connection 10 and the current source 4 is connected to a second connection 11 of the resistance teletransmitter 2. The resistance teletransmitter 2 consists of two fixed resistance ranges 12 and 13 and an effective resistance range 14, in which the tap 1 can be adjusted. The points of application of the tap 1 between the fixed and effective resistance ranges can be defined by the user. The tap 1 constitutes a central connection 15, which is connected to zero potential. Both of the conductors originating from the current sources 3 and 4 and the conductor connecting the tap 1 to zero potential (of course) have a conductor resistance 16, 17 and 18 having a resistance value RL.

This known circuit arrangement is used, for example, for measuring the height of the level of a liquid. It requires two current sources, which must be balanced to equality in order that the conduction resistances do not influence the measuring result. Moreover, balancing steps because of the deviations from the desired values (for example amplification errors, offset) of the instrumental amplifier 7 must be carried out. Likewise, stringent requirements must be imposed on the temperature drift of the instrumental amplifier 7 and on the temperature drift of the succeeding analog-to-digital converter 9, which leads to expensive apparatuses.

Figure 2:
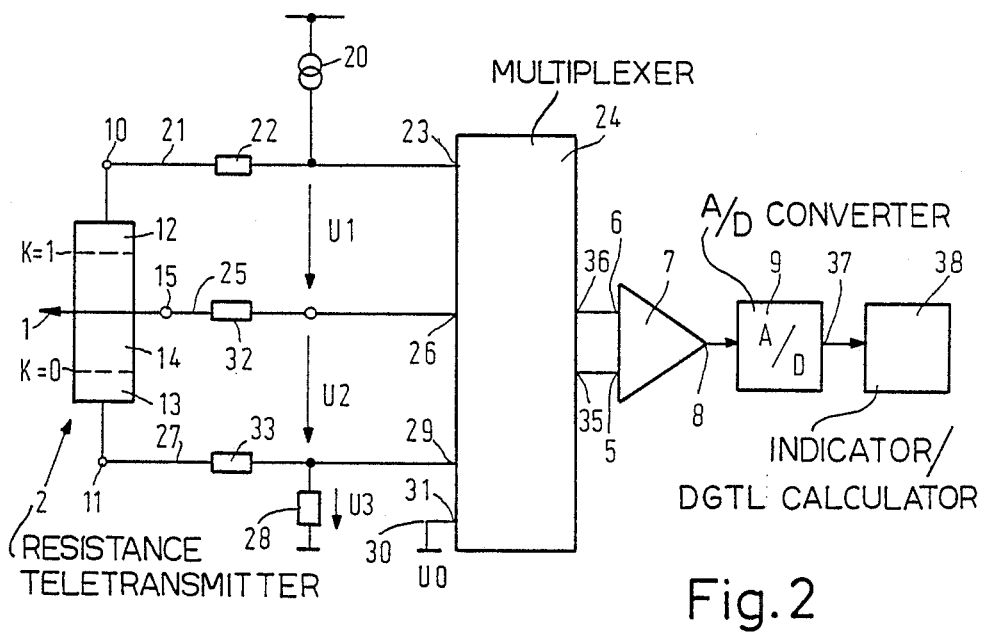
FIG. 2 shows a circuit arrangement for carrying out the method according to the invention of determining the position of the tap on a resistance teletransmitter.

A circuit arrangement according to the invention for determining the position k of the tap 1 on the resistance teletransmitter 2 and for carrying out the method according to the invention is shown in FIG. 2. This circuit arrangement comprises only one current source 20, which is connected to a first conductor 21. The first conductor 21 is connected through the connection 10 to the resistance teletransmitter 2. This conductor 21 of course has a conduction resistance, which in this case is indicated by the resistor 22. Moreover, the current source 20 is connected to an input 23 of a multiplexer 24. A second conductor 25 is connected on the one hand to the central connection 15 of the resistance teletransmitter 2 and on the other hand to a second input 26 of the multiplexer 24. A third conductor 27 is connected on the one hand to the connection 11 of the resistance teletransmitter 2 and on the other hand through the reference resistor 28 to zero potential and to a third input 29 of the multiplexer 24. A fourth conductor 30 connected to zero potential is applied to a fourth multiplexer input 31. The second and third conductors 25 and 27, respectively, also have of course conduction resistances, which are designated by 32 and 33.

The two outputs 35 and 36 of the multiplexer 24 are connected to the inputs 5 and 6 of an instrumental amplifier 7. The output 8 of the instrumental amplifier 7 is connected to an analog-to-digital converter 9, whose output 37 is connected to an indication and digital calculation device 38.

For determining the position k of the tap 1 on the resistance teletransmitter 2, four processing steps are carried out. First a voltage U1 between the conductors 21 and 25 is determined, after which a voltage U2 is measured between the conductors 25 and 27, whereupon a voltage U3 is recorded at the reference resistor 28 for determining the current flowing through the circuit arrangement. Finally, the multiplexer 24 connects its input 31 to its outputs 35 and 36 so that zero potential is applied to the inputs of the instrumental amplifier 7. With this input voltage U0, a digital value D0 is determined in the calculation device 38. The determination of the output voltage of the instrumental amplifier 7 with shortcircuited inputs serves to determine the deviation of the voltage measured from the desired value due to temperature drift and other factors of influence.

The measurement therefore takes place while each time changing over correspondingly the inputs 23, 26, 29 and 31 of the multiplexer 24 to the inputs 5 and 6 of the instrumental amplifier 7. At the output 37 of the succeeding analog-to-digital converter 9, digital values D1, D2, D3 and D0 corresponding to the voltages U1, U2, U3 and U0, respectively, are supplied.

The position k of the tap 1 on the resistance teletransmitter 2 can now be determined by means of the following equation, which can be calculated by making mesh equations. For the position k the equation:

$$k = \frac{U2 - U1}{U3} K1 + K2$$

with $$K1 = \frac{Rs}{2R} \text{ and } K2 = \frac{1}{2} + \frac{R1 - R2}{2R}$$

is therefore obtained, where $0 \leq k \leq 1$ and R1 is the resistance value of the fixed resistance range 12 at the first connection 10, R2 is the resistance value of the other fixed resistance range 13 at the second connection 11, R is the resistance value of the effective resistance range 14 and Rs is the resistance value of the reference resistor 28. It has been supposed that k=1 when the tap 1 is applied to the fixed resistance range 12 and that k=0 when the tap 1 is applied to the fixed resistance range 13. In this method, a balancing step for eliminating the conduction resistances is not required because these resistances do not influence the calculation in the case of equality of the conduction resistances.

In the digital calculation device 38, the position k is calculated, while taking into account the deviations from the desired values due to, for example, the temperature drift in the instrumental amplifier 7 and in the analog-to-digital converter 9, i.e. by taking into account the digital value D0 determined at zero potential. A digital value Dn therefore corresponds to the equation $$Dn = VUn + D0,$$

where V is the amplification of the instrumental amplifier 7 and of the analog-to-digital converter 9. It follows therefrom:

$$k = \frac{D2 - D1}{D3 - D0} K1 + K2.$$

The constants K1 and K2 may be calculated, for example, in the digital calculation device from the supplied resistance values R, R1, R2 and Rs. After the two fixed resistance ranges and the effective resistance range have been defined, the individual resistance values are measured and supplied to the digital calculation device by the user. The constants K1 and K2 can be calculated, however, after the resistance ranges of the resistance teletransmitter 2 have been defined, by another method. The tap 1 of the resistance teletransmitter 2 is then each time taken to the end points of the variable resistance range at k=1 and k=0 and in each final position the voltages U1, U2 and U3 and zero potential are applied to the input of the instrumental amplifier 7. The two following equations are then obtained:

$$K1 = \cfrac{1}{\cfrac{U21 - U11}{U31} - \cfrac{U20 - U10}{U30}},$$

$$K2 = \cfrac{\cfrac{U20 - U10}{U30}}{\cfrac{U20 - U10}{U30} - \cfrac{U21 - U11}{U31}}$$

where Un0, n=1, 2, 3, is a voltage k=0 and Un1, n=1, 2, 3, is a voltage at k=1. While taking into account the equation $$Dn = VUn + D0,$$

for the contants K1 and K2 there are obtained $$K = \cfrac{1}{\cfrac{D21 - D11}{D31 - D01} - \cfrac{D20 - D10}{D30 - D00}},$$

$$K2 = \cfrac{\cfrac{D20 - D10}{D30 - D00}}{\cfrac{D20 - D10}{D30 - D00} - \cfrac{D21 - D11}{D31 - D01}}$$

where Dn, n=1, 2, 3, represents the digital values of the voltages Un, n=1, 2, 3, D0 is the digital value at zero potential at the input of the instrumental amplifier and Dn1 and Dn0, n=0, 1, 2, 3, are the digital values in the positions k=1 and 0, respectively.

What is claimed is:

1. A method of determining the position k of a tap on a resistance teletransmitter including two fixed resistance ranges, between which an effective resistance range is provided, in which the tap is adjustable, while a first connection of the resistance teletransmitter is connected to a current source and can be connected through a first conductor to an instrument amplifier, its tap constituting a central connection being connected to a second conductor and its second connection can be connected through a third conductor to the instrument amplifier, the method comprising:
   (a) determining a voltage U1 between the first conductor and the second conductor that can also be connected to the instrument amplifier,
   (b) determining a voltage U2 between the second conductor and the third conductor,
   (c) recording a voltage U3 across a reference resistor Rs located between the third conductor and zero potential for determining the current flowing through the conductors, and
   (d) calculating the tap position k in a digital computer with reference to the equation $$k = \frac{U2 - U1}{U3} K1 + K2$$

with the constants $$K1 = \frac{Rs}{2R} \text{ and } K2 = \frac{1}{2} + \frac{R1 - R2}{2R}$$

where $0 \leq k \leq 1$ and R1 and R2 are the resistance values of the fixed resistance ranges and R is the resistance value of the effective resistance range.

2. A method as claimed in claim 1 wherein, for determining the constants K1 and K2, the method includes the further steps of displacing the tap on the resistance teletransmitter to the two final positions k=0 and k=1 and in said final positions calculating the constants K1 and K2 from the voltages U1, U2 and U3 according to the equations $$K1 = \cfrac{1}{\cfrac{U21 - U11}{U31} - \cfrac{U20 - U10}{U30}},$$

$$K2 = \cfrac{\cfrac{U20 - U10}{U30}}{\cfrac{U20 - U10}{U30} - \cfrac{U21 - U11}{U31}}$$

where Un0, n=1, 2, 3, is a voltage at k=0 and Un1, n=1, 2, 3, is a voltage at k=1.

3. A method as claimed in claim 2 further comprising: applying to the inputs of the instrument amplifier zero potential and converting the measured voltages, in an analog-to-digital converter succeeding the instrumental amplifier, into corresponding digital values, subsequently determining the position k from the equation:

$$k = \frac{D2 - D1}{D3 - D0} K1 + K2$$

with $$K1 = \cfrac{1}{\cfrac{D21 - D11}{D31 - D01} - \cfrac{D20 - D10}{D30 - D00}},$$

$$K2 = \cfrac{\cfrac{D20 - D10}{D30 - D00}}{\cfrac{D20 - D10}{D30 - D00} - \cfrac{D21 - D11}{D31 - D01}}$$

where Dn, n=1, 2, 3, represents digital values of the voltages Un, n=1, 2, 3, D0 is the digital value at zero potential at the input of the instrument amplifier and Dn1 and Dn0, n=0, 1, 2, 3, represent digital values at the positions k=1 and 0, respectively.

4. A method as claimed in claim 2, characterized in that the calculation of the position k of the tap on the resistance teletransmitter and of the constants K1 and K2 takes place by means of a calculation device.

5. A circuit arrangement for carrying out the method as claimed in claim 1, characterized in that the first connection of a resistance teletransmitter is connected to a current source and to a first conductor, the tap constituting a central connection is connected to a second conductor and the second connection is connected to a third conductor and to a reference resistor connected to zero potential.

6. A circuit arrangement as claimed in claim 5, characterized in that the three conductors extending in a direction away from the resistance teletransmitter are connected to inputs of a multiplexer, whose outputs are connected to the instrumental amplifier, and in that a further input of the multiplexer is connected to zero potential.

7. A circuit arrangement as claimed in claim 6, characterized in that the multiplexer inputs for passing the voltages U1, U2 and U3 and the zero potential on to the instrumental amplifier can be switched in a predetermined order of succession to the inputs of the instrument amplifier.

8. A circuit for determining the position k of an adjustable tap on a resistance teletransmitter having two fixed resistance ranges with an effective resistance range therebetween, said circuit comprising:

means connecting a first terminal of the resistance teletransmitter to a current source and to a first conductor; second means connecting said tap to a second conductor, third means connecting a second terminal of the resistance teletransmitter to a third conductor and to a reference resistor connected in turn to zero voltage, first means for coupling said first, second and third conductors to an instrument amplifier to apply thereto voltages U1, U2, U3, where U1 is the voltage between the first and second conductors, U2 is the voltage between the second and third conductors, and U3 is the voltage across the reference resistor, and second means coupling an output of said amplifier to a digital calculator which determines the tap position k in accordance with the equation $$k = \frac{U2 - U1}{U3} K1 + K2$$

where K1 and K2 are constants in accordance with the expressions $$K1 = \frac{R_s}{2R} \text{ and } K2 = \frac{1}{2} + \frac{R1 - R2}{2R}$$

where $0 \leq k \leq 1$, $R_s$ is the resistance of the reference resistor, R1 and R2 are the resistance values of the fixed resistance ranges and R is the resistance value of the effective resistance range.

9. A circuit as claimed in claim 8 wherein said first coupling means includes a multiplexer having first, second and third inputs coupled to said first, second and third conductors and means for selectively coupling the voltages U1, U2 and U3 to inputs of the instrument amplifier.

10. A circuit as claimed in claim 9 further comprising means for coupling a source of reference voltage to a fourth input of the multiplexer which in turn couples said reference voltage to said inputs of the instrument amplifier.

* * * * *